(12) United States Patent
Jawad et al.

(10) Patent No.: US 8,096,880 B2
(45) Date of Patent: Jan. 17, 2012

(54) SYSTEMS AND METHODS FOR REDUCING JITTER ASSOCIATED WITH A CONTROL DEVICE

(75) Inventors: Mark Jawad, Redmond, WA (US);
Steve Rabin, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 1138 days.

(21) Appl. No.: 11/504,108

(22) Filed: Aug. 15, 2006

(65) Prior Publication Data

US 2008/0051197 A1  Feb. 28, 2008

(51) Int. Cl.
*A63F 9/24* (2006.01)
*G06F 17/00* (2006.01)
*G06F 19/00* (2006.01)
*G09G 5/00* (2006.01)

(52) U.S. Cl. .............. 463/36; 463/38; 345/156
(58) Field of Classification Search .............. 463/36–38; 345/156–157
See application file for complete search history.

(56) References Cited

U.S. PATENT DOCUMENTS

| | | | |
|---|---|---|---|
| 4,285,523 A | | 8/1981 | Lamelson |
| 5,453,758 A | * | 9/1995 | Sato .............................. 345/158 |
| 5,574,479 A | | 11/1996 | Odell |
| 5,627,565 A | | 5/1997 | Morishita et al. |
| 5,999,895 A | * | 12/1999 | Forest ............................. 704/1 |
| 6,045,446 A | | 4/2000 | Ohshima |
| 6,110,039 A | | 8/2000 | Oh |
| 6,146,278 A | | 11/2000 | Kobayashi |
| 6,244,956 B1 | | 6/2001 | Nakayama et al. |
| 6,251,011 B1 | | 6/2001 | Yamazaki |
| 6,545,661 B1 | | 4/2003 | Goschy et al. |
| 6,890,262 B2 | | 5/2005 | Oishi et al. |
| 6,926,610 B2 | | 8/2005 | Kobayashi et al. |
| 6,982,697 B2 | | 1/2006 | Wilson et al. |
| 7,139,983 B2 | | 11/2006 | Kelts |
| 7,158,118 B2 | | 1/2007 | Liberty |
| 7,262,760 B2 | | 8/2007 | Liberty |
| 7,292,151 B2 | | 11/2007 | Ferguson et al. |
| 7,414,611 B2 | | 8/2008 | Liberty |
| 7,535,456 B2 | * | 5/2009 | Liberty et al. ................. 345/158 |
| 2007/0002037 A1 | | 1/2007 | Kuroki et al. |
| 2007/0298882 A1 | | 12/2007 | Marks et al. |

FOREIGN PATENT DOCUMENTS

| | | |
|---|---|---|
| JP | 08-071252 | 3/1996 |
| JP | 2002-081909 | 3/2002 |
| WO | WO 94/02931 | 2/1994 |

OTHER PUBLICATIONS

Gear Technology, "Gears at Play," Nov./Dec. 2003, p. 56.
ADXL202 Specification Sheet: Low Cost ± g Dual Axis i Mems® Accelerometer with Digital Output: Analog Devices, Inc., 1998.
ADXL330 Specification Sheet: Small, Low Power; 3-Axis ±3 g i Mems® Accelerometer: Analog Devices, Inc., 2007.

(Continued)

*Primary Examiner* — David L Lewis
*Assistant Examiner* — Robert Mosser
(74) *Attorney, Agent, or Firm* — Nixon & Vanderhye P.C.

(57) ABSTRACT

An example system and method is provided for filtering input values associated with movement of a hand-held control device. A current input value is compared with an average input value and, based on the comparing, an output value is generated in a range between the current input value and a prior output value.

23 Claims, 10 Drawing Sheets

OTHER PUBLICATIONS

Pictures of Microsoft Xwand retrieved from http://www.kf12.com/blogs/uploads/xwand.jpg and http://www.cs.cmu.edu/%7Edwilson/images.xwand.jpb.

Wilson, Andrew D., et al.; "Demonstration of the XWand Interface for Intelligent Spaces;" Microsoft Research; UIST '02 Companion; pp. 37-38.

Wilson, Daniel, et al.; "Gesture Recognition Using the XWand;" Robotics Institute; Carnegie Mellon University; Tech Report CMU-RI-TR-04-57; Apr. 2004.

Wilson, Andy, "XWand UI for Intelligent Environments;" Apr. 26, 2004; retrieved from http://research.microsoft.com/en-us/um/people/awilson/wand/default.htm.

Wilson, Andrew, et al.; "XWand, UI for Intelligent Spaces;" Microsoft Research; CHI 2003; Apr. 5-10, 2003; Ft. Lauderdale, FL.

SELECTECH Air Mouse; Description; retrieved from http://cgi.ebay.com.my/ws/eBayISAPI.dll?ViewItem& item= 3500966666-75 & indexURL.

* cited by examiner

NON-LIMITING
EXAMPLE GAME SYSTEM

NON-LIMITING
EXAMPLE CONTROLLER

NON-LIMITING
EXAMPLE CONTROLLER

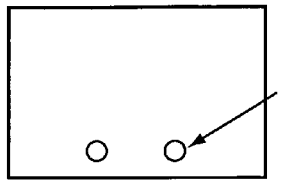

When controller 107 is pointed upward, the coordinates of the markers move down.

*Fig. 5B-1*

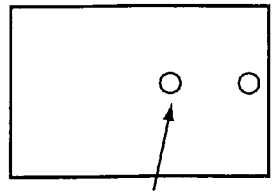

When controller 107 is pointed left, the coordinates of the markers move to the right.

*Fig. 5B-2*

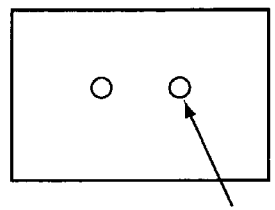

*Fig. 5B-3* When the markers are in the center of the coordinates, the controller 107 is pointing to the middle of the screen.

When controller 107 is pointed right, the coordinates of the markers move to the left.

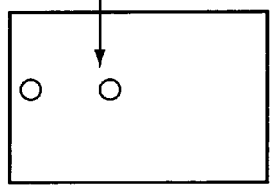

*Fig. 5B-4*

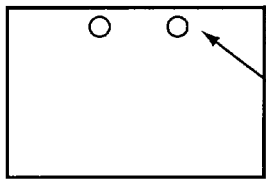

When controller 107 is pointed downward, the coordinates of the markers move up.

*Fig. 5B-5*

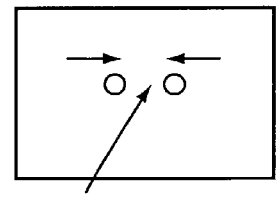

When controller 107 is moved away from markers 108a, 108b, the distance between the markers shrinks.

*Fig. 5B-6*

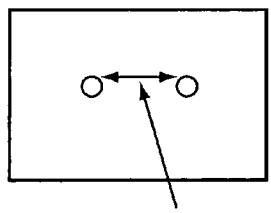

When controller 107 is moved toward markers 108a, 108b, the distance between the markers expands.

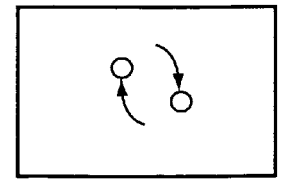

When controller 107 is rotated, the marker coordinates will rotate.

SYSTEMS AND METHODS FOR REDUCING JITTER ASSOCIATED WITH A CONTROL DEVICE

BACKGROUND AND SUMMARY

This application generally describes systems and methods for reducing jitter associated with a handheld control device such as a controller for a video game system.

User inputs to computer systems may be supplied in various ways. For example, when the computer system is a video game console, inputs are typically supplied using cross-switches, joysticks, buttons and the like provided on a controller. A cross-switch or a joystick may be used to control movement of a video game object in various directions and various buttons may be used to control character actions such as jumping, using a weapon and the like.

The controller described in this patent application additionally or alternatively includes an accelerometer arrangement that generates inputs to a video game console or other computer system based on certain movements and/or orientations of the controller. Such a controller can provide a more intuitive user interface in which, for example, movement of a video game object can be controlled by moving the controller in a particular manner. By way of illustration, a player may increase or decrease the altitude of a plane in a video game by tilting the controller up or down. The accelerometer arrangement can be used to provide gaming experiences that cannot be provided easily (if at all) using a controller having cross-switches, joysticks, buttons, etc.

In some instances, it may be desirable that not all movements of the controller result in movement or control of a video game object. For example, a player may desire hold the controller steady so that a video game object moves in a particular manner (i.e., straight). Even though the player may intend to hold the controller steady, the player's hand (or hands) may jitter or move slightly. This jitter or slight movement could cause unintended deviations from the desired movement of the video game object (e.g., a character may exhibit some side-to-side movement instead of only straight-ahead movement).

This patent application describes example systems and methods that can be used to reduce the effects of unwanted jitter or slight movements associated with a hand-held control device such as a video game controller.

Certain example methods and systems described herein use an algorithm that effectively "filters" inputs produced by movement of the control device. One particular example algorithm operates as an adaptive filter with a sliding control that adapts to current movement of the control device. In an example algorithm, the slider is controlled by the difference ("delta") between the raw input and a moving historical average of some number of previous inputs.

With the sliding control set at a first limit (e.g., 0.0), the algorithm output is equal to the previous output. Setting the sliding control at this limit means that the algorithm output is not responsive to the inputs associated with movement of the control device. Thus, this setting can completely stabilize the algorithm output so that movements of the control device (e.g., small movements) do not, for example, affect a desired movement of a video game object.

With the control set at a second limit (e.g., 1.0), the algorithm output is equal to the raw input associated with movement of the control device. Setting the sliding control at this limit means that the algorithm output is completely responsive to the inputs associated with movement of the control device. Thus, this setting can be used, for example, when it is desired for movement of the control device to change the movement of a video game object (e.g., turn left, turn right).

When the slider control is set between 0.0 and 1.0, the output is a linear combination of the raw input and the previous output.

In practice, when a person holds the control device steady, the accelerometer output signals bounce around an average. The "delta" in this case is very small, so the example algorithm results in very stable output. When a person moves the control device suddenly, the "delta" between the most recent input and the historical moving average is quite large, which results in completely responsive output (by using 100% of the most recent input). When the control device changes from being steady to being moved vigorously, the algorithm weights are ramped accordingly in order to smoothly transition from steady output to responsive output. The result is that the output is always substantially smooth without any noticeable jarring transitions when the algorithm adapts to the current movement of the control device.

The systems and methods described herein are not limited to use with control devices in which movement is detected by accelerometers. By way of example without limitation, these systems and methods can be used with additionally or alternatively with an optical system for determining a direction in which the control device is pointing.

BRIEF DESCRIPTION OF THE DRAWINGS

FIGS. 5B-1 to 5B-8 are used in an explanation of how a direction in which example controller 107 is pointing is determined.

FIG. 8 shows example hysteresis applied to an output of an example adaptive filter.

DETAILED DESCRIPTION OF EXAMPLE EMBODIMENTS

Figure 1:
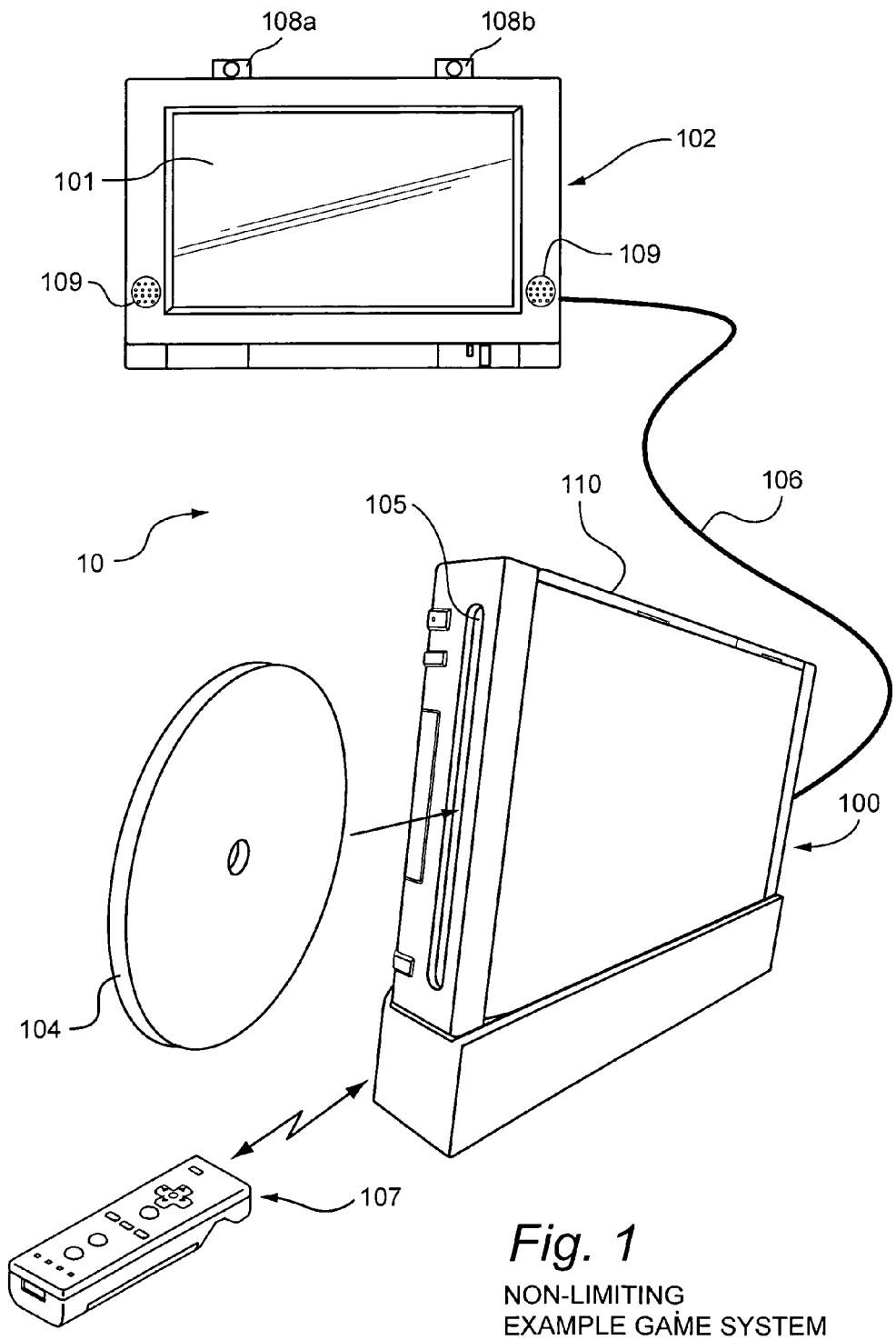
FIG. 1 is a diagram of an example game system 10.

FIG. 1 shows a non-limiting example game system 10 including a game console 100, a television 102 and a controller 107.

Game console 100 executes a game program or other application stored on optical disc 104 inserted into slot 105 formed in housing 110 thereof. The result of the execution of the game program or other application is displayed on display screen 101 of television 102 to which game console 100 is connected by cable 106. Audio associated with the game program or other application is output via speakers 109 of television 102. While an optical disk is shown in FIG. 1, the game program or other application may alternatively or additionally be stored on other storage media such as semiconductor memories, magneto-optical memories, magnetic memories and the like.

Controller 107 wirelessly transmits data such as game control data to the game console 100. The game control data may be generated using an operation section of controller 107 having, for example, a plurality of operation buttons, a key, a stick and the like. Controller 107 may also wirelessly receive data transmitted from game console 100. Any one of various wireless protocols such as Bluetooth® may be used for the wireless transmissions between controller 107 and game console 100.

As discussed below, controller 107 also includes an imaging information calculation section for capturing and processing images from light-emitting devices 108a and 108b. Although markers 108a and 108b are shown in FIG. 1 as being above television 100, they may also be positioned below television 100. In one implementation, a center point between light-emitting devices 108a and 108b is substantially aligned with a vertical center-line of display screen 101. The images from light-emitting devices 108a and 108b can be used to determine a direction in which controller 107 is pointing as well as a distance of controller 107 from display screen 101. By way of example without limitation, light-emitting devices 108a and 108b may be implemented as two LED modules (hereinafter, referred to as "markers") provided in the vicinity of the display screen of television 102. The markers each output infrared light and the imaging information calculation section of controller 107 detects the light output from the LED modules to determine a direction in which controller 107 is pointing and a distance of controller 107 from display 101 as mentioned above.

Figure 2:
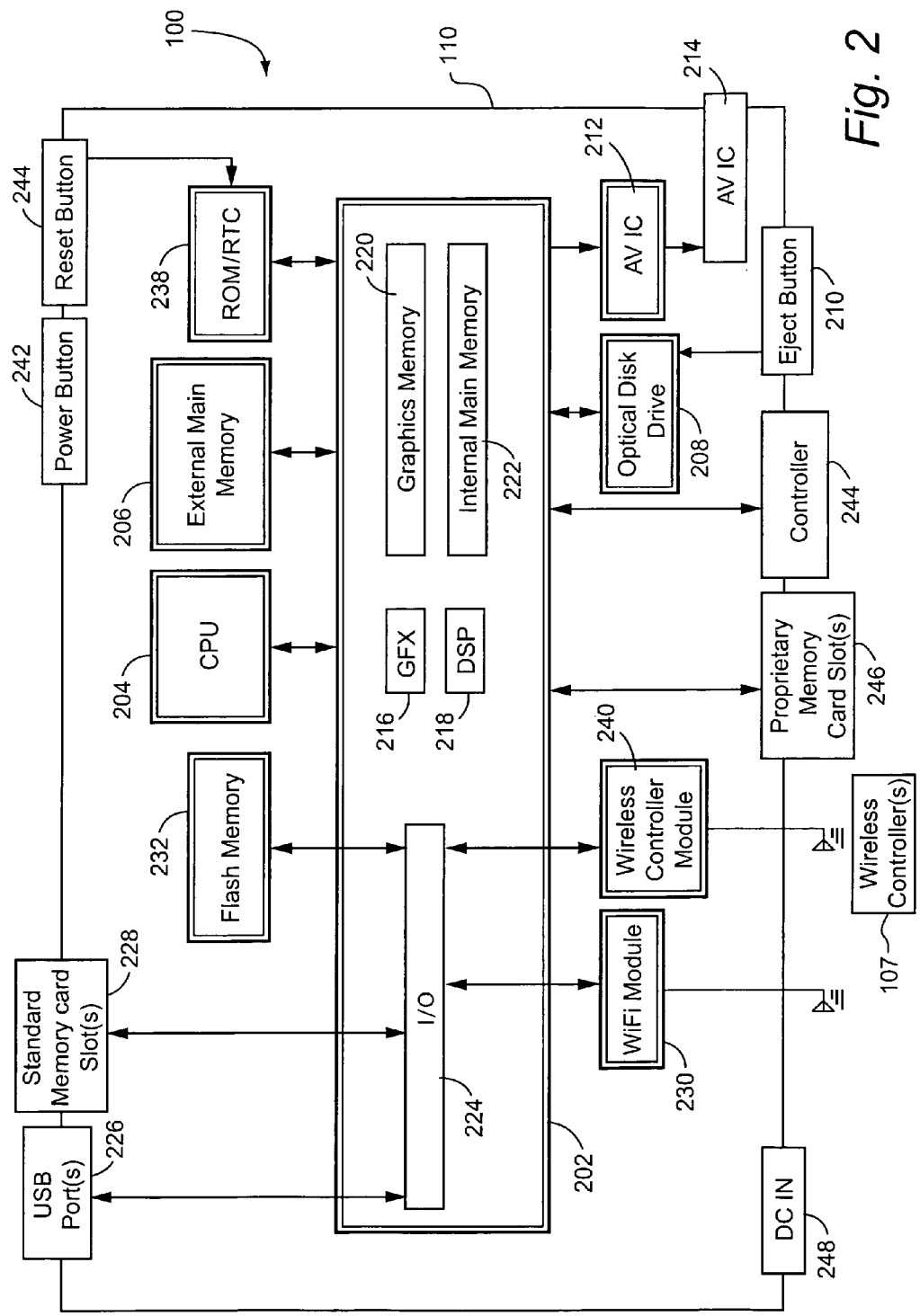
FIG. 2 is a block diagram of example game console 100 shown in FIG. 1.

With reference to the block diagram of FIG. 2, game console 100 includes a RISC central processing unit (CPU) 204 for executing various types of applications including (but not limited to) video game programs. CPU 204 executes a boot program stored, for example, in a boot ROM to initialize game console 100 and then executes an application (or applications) stored on optical disc 104, which is inserted in optical disk drive 208. User-accessible eject button 210 provided on housing 110 of game console 100 may be used to eject an optical disk from disk drive 208.

In one example implementation, optical disk drive 208 receives both optical disks of a first type (e.g., of a first size and/or of a first data structure, etc.) containing applications developed to take advantage of the capabilities of CPU 204 and graphics processor 216 and optical disks of a second type (e.g., of a second size and/or a second data structure) containing applications originally developed for execution by a CPU and/or graphics processor having capabilities different than those of CPU 204 and/or graphics processor 216. For example, the optical disks of the second type may be applications originally developed for the Nintendo GameCube platform.

CPU 204 is connected to system LSI 202 that includes graphics processing unit (GPU) 216 with an associated graphics memory 220, audio digital signal processor (DSP) 218, internal main memory 222 and input/output (IO) processor 224.

IO processor 224 of system LSI 202 is connected to one or more USB ports 226, one or more standard memory card slots (connectors) 228, WiFi module 230, flash memory 232 and wireless controller module 240.

USB ports 226 are used to connect a wide variety of external devices to game console 100. These devices include by way of example without limitation game controllers, keyboards, storage devices such as external hard-disk drives, printers, digital cameras, and the like. USB ports 226 may also be used for wired network (e.g., LAN) connections. In one example implementation, two USB ports 226 are provided.

Standard memory card slots (connectors) 228 are adapted to receive industry-standard-type memory cards (e.g., SD memory cards). In one example implementation, one memory card slot 228 is provided. These memory cards are generally used as data carriers but of course this use is provided by way of illustration, not limitation. For example, a player may store game data for a particular game on a memory card and bring the memory card to a friend's house to play the game on the friend's game console. The memory cards may also be used to transfer data between the game console and personal computers, digital cameras, and the like.

WiFi module 230 enables game console 100 to be connected to a wireless access point. The access point may provide internet connectivity for on-line gaming with players at other locations (with or without voice chat capabilities), as well as web browsing, e-mail, file downloads (including game downloads) and many other types of on-line activities. In some implementations, WiFi module 230 may also be used for communication with other game devices such as suitably-equipped hand-held game devices. Module 230 is referred to herein as "WiFi", which is generally a designation used in connection with the family of IEEE 802.11 specifications. However, game console 100 may of course alternatively or additionally use wireless modules that conform to other wireless standards.

Flash memory 232 stores, by way of example without limitation, game save data, system files, internal applications for the console and downloaded data (such as games).

Wireless controller module 240 receives signals wirelessly transmitted from one or more controllers 107 and provides these received signals to 10 processor 224. The signals transmitted by controller 107 to wireless controller module 240 may include signals generated by controller 107 itself as well as by other devices that may be connected to controller 107. By way of example, some games may utilize separate right- and left-hand inputs. For such games, another controller (not shown) may be connected (e.g., by a wired connection) to controller 107 and controller 107 can transmit to wireless controller module 240 signals generated by itself and by the other controller.

Wireless controller module 240 may also wirelessly transmit signals to controller 107. By way of example without limitation, controller 107 (and/or another game controller connected thereto) may be provided with vibration circuitry and vibration circuitry control signals may be sent via wireless controller module 240 to control the vibration circuitry (e.g., by turning the vibration circuitry on and off). By way of further example without limitation, controller 107 may be provided with (or be connected to) a speaker (not shown) and audio signals for output from this speaker may be wirelessly communicated to controller 107 via wireless controller module 240. By way of still further example without limitation, controller 107 may be provided with (or be connected to) a display device (not shown) and display signals for output from this display device may be wirelessly communicated to controller 107 via wireless controller module 240.

Proprietary memory card slots 246 are adapted to receive proprietary memory cards. In one example implementation, two such slots are provided. These proprietary memory cards have some non-standard feature(s) such as a non-standard connector and/or a non-standard memory architecture. For example, one or more of the memory card slots 246 may be adapted to receive memory cards used with the Nintendo GameCube platform. In this case, memory cards inserted in such slots can transfer data from games developed for the GameCube platform. In an example implementation, memory card slots 246 may be used for read-only access to the memory cards inserted therein and limitations may be placed on whether data on these memory cards can be copied or transferred to other storage media such as standard memory cards inserted into slots 228.

One or more controller connectors 244 are adapted for wired connection to respective game controllers. In one example implementation, four such connectors are provided for wired connection to game controllers for the Nintendo GameCube platform. Alternatively, respective wireless receivers may be connected to connectors 244 to receive signals from wireless game controllers. These connectors enable players, among other things, to use controllers for the Nintendo GameCube platform when an optical disk for a game developed for this platform is inserted into optical disk drive 208.

A connector 248 is provided for connecting game console 100 to DC power derived, for example, from an ordinary wall outlet. Of course, the power may be derived from one or more batteries.

GPU 216 performs image processing based on instructions from CPU 204. GPU 216 includes, for example, circuitry for performing calculations necessary for displaying three-dimensional (3D) graphics. GPU 216 performs image processing using graphics memory 220 dedicated for image processing and a part of internal main memory 222. GPU 216 generates image data for output to television 102 by audio/video connector 214 via audio/video IC (interface) 212.

Audio DSP 218 performs audio processing based on instructions from CPU 204. The audio generated by audio DSP 218 is output to television 102 by audio/video connector 214 via audio/video IC 212.

External main memory 206 and internal main memory 222 are storage areas directly accessible by CPU 204. For example, these memories can store an application program such as a game program read from optical disc 104 by the CPU 204, various types of data or the like.

ROM/RTC 238 includes a real-time clock and preferably runs off of an internal battery (not shown) so as to be usable even if no external power is supplied. ROM/RTC 238 also may include a boot ROM and SRAM usable by the console.

Power button 242 is used to power game console 100 on and off. In one example implementation, power button 242 must be depressed for a specified time (e.g., one or two seconds) to turn the console off so as to reduce the possibility of inadvertently turn-off. Reset button 244 is used to reset (re-boot) game console 100.

Figure 3A:
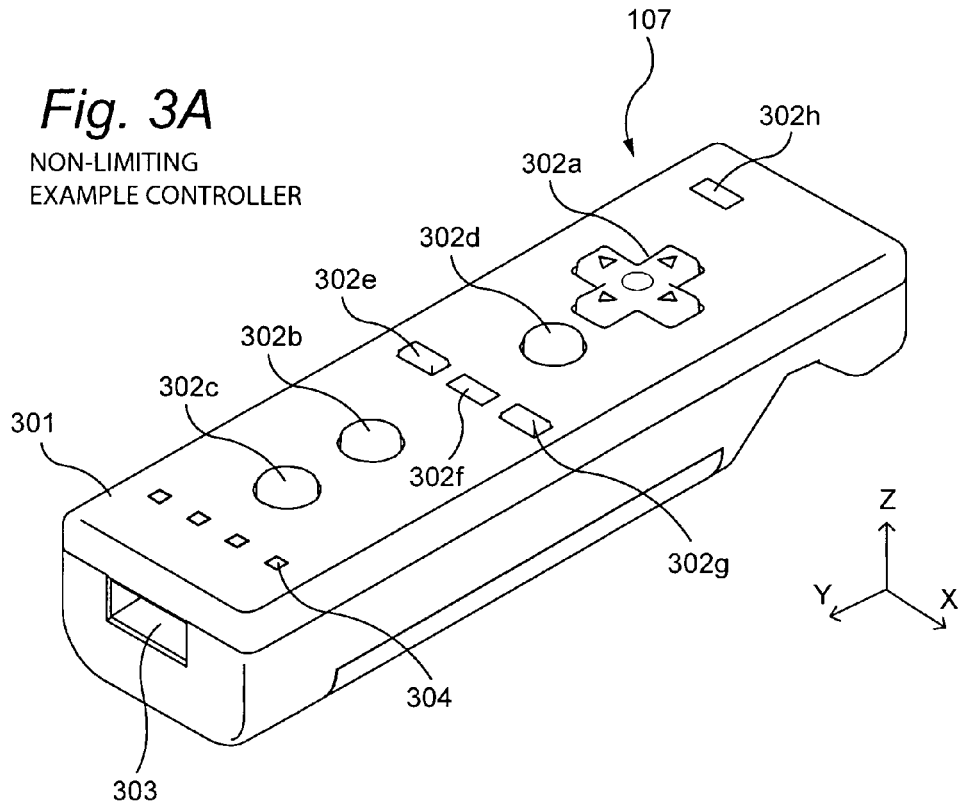
FIGS. 3A and 3B are perspective views of a top and a bottom of example controller 107 shown in FIG. 1.
Figure 3B:
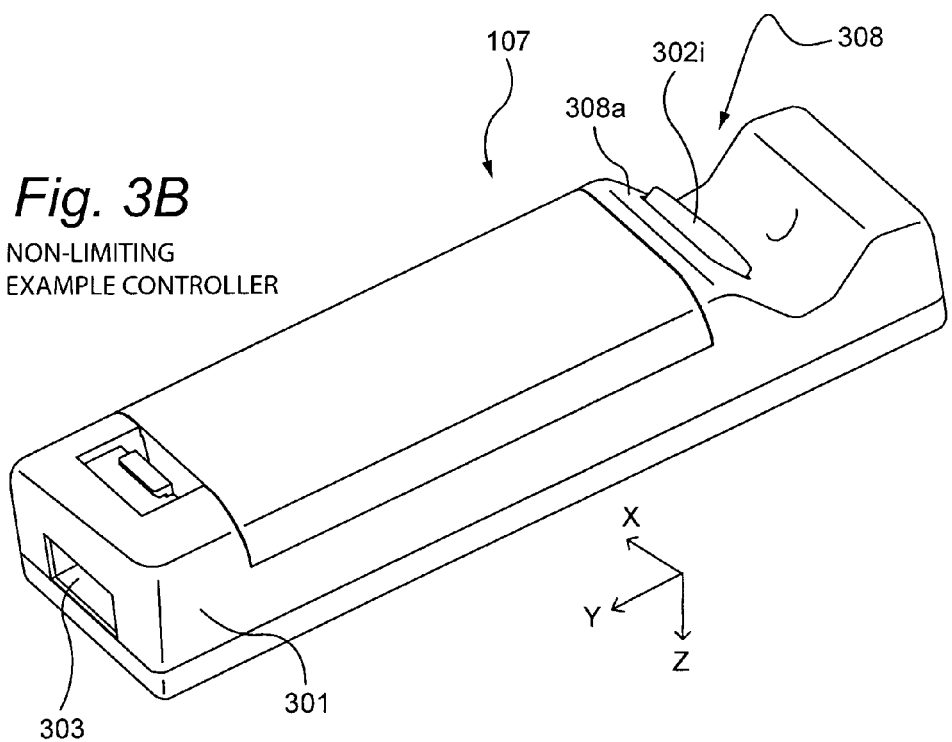
Figure 4:
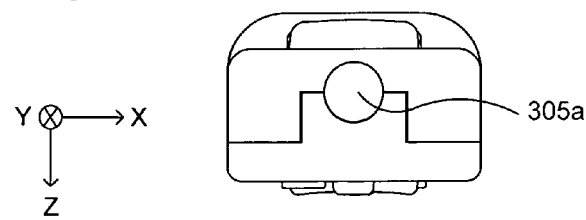
FIG. 4 is a front view of example controller 107 shown in FIG. 1.

With reference to FIGS. 3 and 4, example controller 107 includes a housing 301 on which operating controls 302a-302h are provided. Housing 301 has a generally parallelepiped shape and is sized to be conveniently grasped by a player's hand. Cross-switch 302a is provided at the center of a forward part of a top surface of the housing 301. Cross-switch 302a is a cross-shaped four-direction push switch which includes operation portions corresponding to the directions designated by the arrows (front, rear, right and left), which are respectively located on cross-shaped projecting portions. A player selects one of the front, rear, right and left directions by pressing one of the operation portions of the cross-switch 302a. By actuating cross-switch 302a, the player can, for example, move a character in different directions in a virtual game world.

Cross-switch 302a is described by way of example and other types of operation sections may be used. By way of example without limitation, a composite switch including a push switch with a ring-shaped four-direction operation section and a center switch may be used. By way of further example without limitation, an inclinable stick projecting from the top surface of housing 301 that outputs signals in accordance with the inclining direction of the stick may be used. By way of still further example without limitation, a horizontally slidable disc-shaped member that outputs signals in accordance with the sliding direction of the disc-shaped member may be used. By way of still further example without limitation, a touch pad may be used. By way of still further example without limitation, separate switches corresponding to at least four directions (e.g., front, rear, right and left) that output respective signals when pressed by a player can be used.

Buttons (or keys) 302b through 302g are provided rearward of cross-switch 302a on the top surface of housing 301. Buttons 302b through 302g are operation devices that output respective signals when a player presses them. For example, buttons 302b through 302d are respectively an "X" button, a "Y" button and a "B" button and buttons 302e through 302g are respectively a select switch, a menu switch and a start switch, for example. Generally, buttons 302b through 302g are assigned various functions in accordance with the application being executed by game console 100. In an exemplary arrangement shown in FIG. 3A, buttons 302b through 302d are linearly arranged along a front-to-back centerline of the top surface of housing 301. Buttons 302e through 302g are linearly arranged along a left-to-right line between buttons 302b and 302d. Button 302f may be recessed from a top surface of housing 701 to reduce the possibility of inadvertent pressing by a player grasping controller 107.

Button 302h is provided forward of cross-switch 302a on the top surface of the housing 301. Button 302h is a power switch for remote on-off switching of the power to game console 100. Button 302h may also be recessed from a top surface of housing 301 to reduce the possibility of inadvertent pressing by a player.

A plurality (e.g., four) of LEDs 304 is provided rearward of button 302c on the top surface of housing 301. Controller 107 is assigned a controller type (number) so as to be distinguishable from other controllers used with game console 100 and LEDs 304 may be used to provide a player a visual indication of this assigned controller number. For example, when controller 107 transmits signals to wireless controller module 240, one of the plurality of LEDs corresponding to the controller type is lit up.

With reference to FIG. 3B, a recessed portion 308 is formed on a bottom surface of housing 301. Recessed portion 308 is positioned so as to receive an index finger or middle finger of a player holding controller 107. A button 302i is provided on a rear, sloped surface 308a of the recessed portion. Button 302i functions, for example, as an "A" button which can be used, by way of illustration, as a trigger switch in a shooting game.

As shown in FIG. 4, an imaging element 305a is provided on a front surface of controller housing 301. Imaging element 305a is part of the imaging information calculation section of controller 107 that analyzes image data received from markers 108a and 108b. Imaging information calculation section 305 has a maximum sampling period of, for example, about 200 frames/sec., and therefore can trace and analyze even relatively fast motion of controller 107. Additional details of the operation of this section may be found in Application Nos. 60/716,937, entitled "VIDEO GAME SYSTEM WITH WIRELESS MODULAR HANDHELD CONTROLLER," filed on Sep. 15, 2005; 60/732,648, entitled "INFORMA- TION PROCESSING PROGRAM," filed on Nov. 3, 2005; and application No. 60/732,649, entitled "INFORMATION PROCESSING SYSTEM AND PROGRAM THEREFOR," filed on Nov. 3, 2005. The entire contents of each of these applications are expressly incorporated herein.

Connector 303 is provided on a rear surface of controller housing 301. Connector 303 is used to connect devices to controller 107. For example, a second controller of similar or different configuration may be connected to controller 107 via connector 303 in order to allow a player to play games using game control inputs from both hands. Other devices including game controllers for other game consoles, input devices such as keyboards, keypads and touchpads and output devices such as speakers and displays may be connected to controller 107 using connector 303.

For ease of explanation in what follows, a coordinate system for controller 107 will be defined. As shown in FIGS. 3 and 4, a left-handed X, Y, Z coordinate system has been defined for controller 107. Of course, this coordinate system is described by way of example without limitation and the systems and methods described herein are equally applicable when other coordinate systems are used.

Figure 5A:
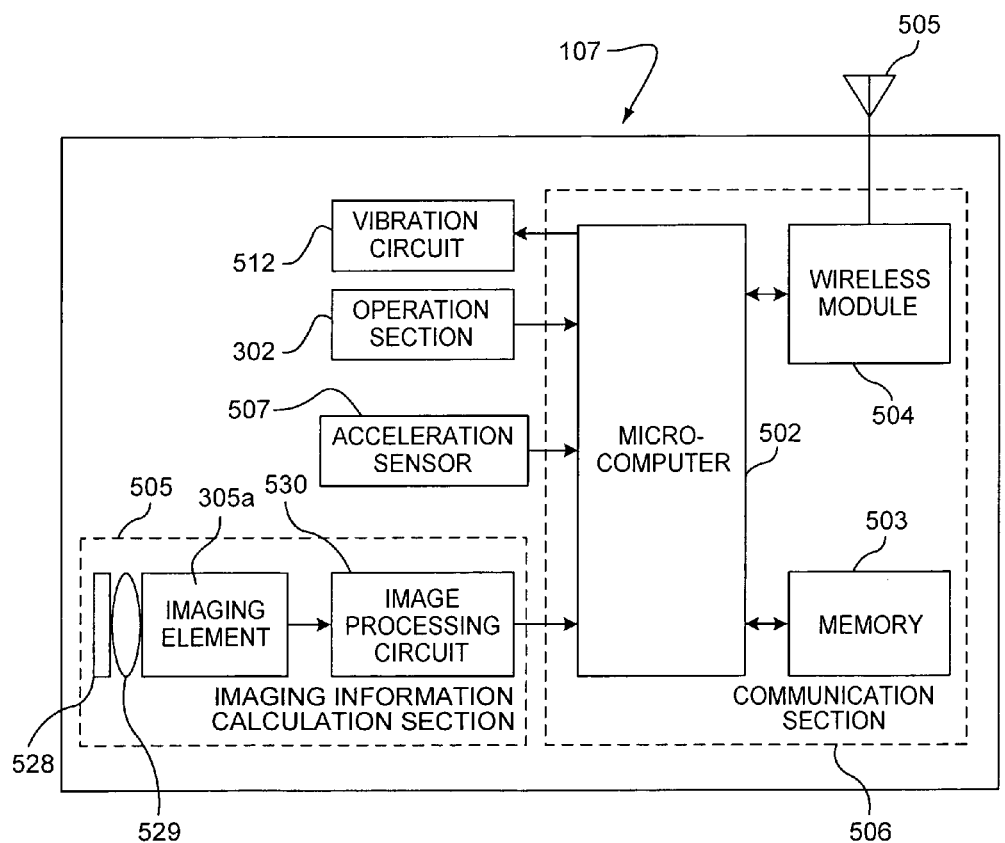
FIG. 5A is a block diagram of example controller 107 shown in FIG. 1.

As shown in the block diagram of FIG. 5A, controller 107 includes a three-axis, linear acceleration sensor 507 that detects linear acceleration in three directions, i.e., the up/down direction (Z-axis shown in FIGS. 3 and 4), the left/right direction (X-axis shown in FIGS. 3 and 4), and the forward/backward direction (Y-axis shown in FIGS. 3 and 4). Alternatively, a two-axis linear accelerometer that only detects linear acceleration along each of the Y-axis and Z-axis, for example, may be used or a one-axis linear accelerometer that only detects linear acceleration along the Z-axis, for example, may be used. Generally speaking, the accelerometer arrangement (e.g., three-axis or two-axis) will depend on the type of control signals desired. As a non-limiting example, the three-axis or two-axis linear accelerometer may be of the type available from Analog Devices, Inc. or STMicroelectronics N.V. Preferably, acceleration sensor 507 is an electrostatic capacitance or capacitance-coupling type that is based on silicon micro-machined MEMS (micro-electromechanical systems) technology. However, any other suitable accelerometer technology (e.g., piezoelectric type or piezoresistance type) now existing or later developed may be used to provide three-axis or two-axis linear acceleration sensor 507.

As one skilled in the art understands, linear accelerometers, as used in acceleration sensor 507, are only capable of detecting acceleration along a straight line corresponding to each axis of the acceleration sensor. In other words, the direct output of acceleration sensor 507 is limited to signals indicative of linear acceleration (static or dynamic) along each of the two or three axes thereof. As a result, acceleration sensor 507 cannot directly detect movement along a non-linear (e.g. arcuate) path, rotation, rotational movement, angular displacement, tilt, position, attitude or any other physical characteristic.

However, through additional processing of the linear acceleration signals output from acceleration sensor 507, additional information relating to controller 107 can be inferred or calculated (i.e., determined), as one skilled in the art will readily understand from the description herein. For example, by detecting static, linear acceleration (i.e., gravity), the linear acceleration output of acceleration sensor 507 can be used to determine tilt of the object relative to the gravity vector by correlating tilt angles with detected linear acceleration. In this way, acceleration sensor 507 can be used in combination with micro-computer 502 of controller 107 (or another processor) to determine tilt, attitude or position of controller 107. Similarly, various movements and/or positions of controller 107 can be calculated through processing of the linear acceleration signals generated by acceleration sensor 507 when controller 107 containing acceleration sensor 507 is subjected to dynamic accelerations by, for example, the hand of a user.

In another embodiment, acceleration sensor 507 may include an embedded signal processor or other type of dedicated processor for performing any desired processing of the acceleration signals output from the accelerometers therein prior to outputting signals to micro-computer 502. For example, the embedded or dedicated processor could convert the detected acceleration signal to a corresponding tilt angle (or other desired parameter) when the acceleration sensor is intended to detect static acceleration (i.e., gravity).

Returning to FIG. 5A, imaging information calculation section 505 of controller 107 includes infrared filter 528, lens 529, imaging element 305a and image processing circuit 530. Infrared filter 528 allows only infrared light to pass therethrough from the light that is incident on the front surface of controller 107. Lens 529 collects and focuses the infrared light from infrared filter 528 on imaging element 305a. Imaging element 305a is a solid-state imaging device such as, for example, a CMOS sensor or a CCD. Imaging element 305a captures images of the infrared light from markers 108a and 108b collected by lens 529. Accordingly, imaging element 305a captures images of only the infrared light that has passed through infrared filter 528 and generates image data based thereon. This image data is processed by image processing circuit 530 which detects an area thereof having high brightness, and, based on this detecting, outputs processing result data representing the detected coordinate position and size of the area to communication section 506. From this information, the direction in which controller 107 is pointing and the distance of controller 107 from display 101 can be determined.

FIGS. 5B-1 to 5B-8 show how a rotation of the controller or a direction in which controller 107 is pointing can be determined using markers 108a, 108b. In this example implementation, controller 107 points to the intermediate coordinates of the two markers on the sensor bar. In an example implementation, the pointer coordinates are 0-1023 on the X-axis and 0-767 on the Y-axis. With reference to FIG. 5B-1, when controller 107 is pointed upward, the coordinates of the markers detected at remote control 107 move down. With reference to FIG. 5B-2, when controller 107 is pointed left, the coordinates of the markers move to the right. With reference to FIG. 5B-3, when the markers are centered, remote controller 107 is pointed at the middle of the screen. With reference to FIG. 5B-4, when controller 107 is pointed right, the coordinates of the markers move to the left. With reference to FIG. 5B-5, when controller 107 is pointed downward, the coordinates of the markers move up. With reference to FIG. 5B-6, when controller 107 is moved away from markers 108a, 108b, the distance between the markers is reduced. With reference to FIG. 5B-7, when controller 107 is moved toward markers 108a, 108b, the distance between the markers increases. With reference to FIG. 5B-8, when controller 107 is rotated, the marker coordinates will rotate.

Figure 5C:
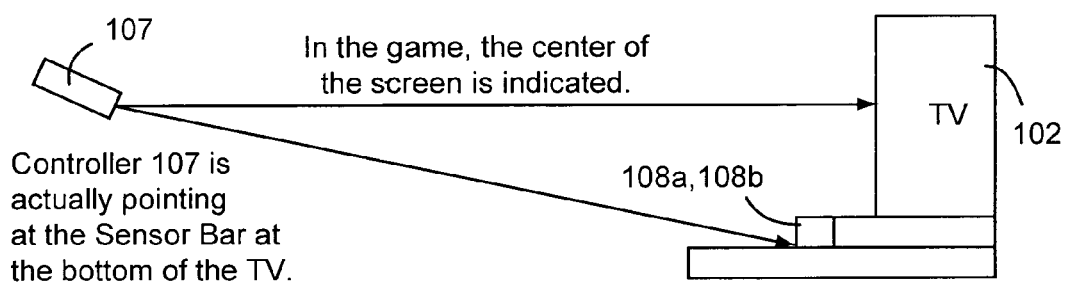
FIG. 5C is used in an explanation of the pointing direction of example controller 107.

FIG. 5C shows sensors 108a, 108b positioned below the display screen 101 of the television 102. As shown in FIG. 5C, when controller 107 is pointing toward the sensors, it is not actually pointing at the center of display screen 101. However, the game program or application executed by game machine 100 may treat this situation as one in which controller 107 is pointed at the center of the screen. In this case, the actual coordinates and the program coordinates will differ, but when the user is sufficiently far from the television, his or her brain automatically corrects for the difference between the coordinates seen by the eye and the coordinates for hand movement.

Again returning to FIG. 5A, vibration circuit 512 may also be included in controller 107. Vibration circuit 512 may be, for example, a vibration motor or a solenoid. Controller 107 is vibrated by actuation of the vibration circuit 512 (e.g., in response to signals from game console 100), and the vibration is conveyed to the hand of the player grasping controller 107. Thus, a so-called vibration-responsive game may be realized.

As described above, acceleration sensor 507 detects and outputs the acceleration in the form of components of three axial directions of controller 107, i.e., the components of the up-down direction (Z-axis direction), the left-right direction (X-axis direction), and the front-rear direction (the Y-axis direction) of controller 107. Data representing the acceleration as the components of the three axial directions detected by acceleration sensor 507 is output to communication section 506. Based on the acceleration data which is output from acceleration sensor 507, a motion of controller 107 can be determined.

Communication section 506 includes micro-computer 502, memory 503, wireless module 504 and antenna 505. Micro-computer 502 controls wireless module 504 for transmitting and receiving data while using memory 503 as a storage area during processing. Micro-computer 502 is supplied with data including operation signals (e.g., cross-switch, button or key data) from operation section 302, acceleration signals in the three axial directions (X-axis, Y-axis and Z-axis direction acceleration data) from acceleration sensor 507, and processing result data from imaging information calculation section 505. Micro-computer 502 temporarily stores the data supplied thereto in memory 503 as transmission data for transmission to game console 100. The wireless transmission from communication section 506 to game console 100 is performed at predetermined time intervals. Because game processing is generally performed at a cycle of ⅙₀ sec. (16.7 ms), the wireless transmission is preferably performed at a cycle of a shorter time period. For example, a communication section structured using Bluetooth® technology can have a cycle of 5 ms. At the transmission time, micro-computer 502 outputs the transmission data stored in memory 503 as a series of operation information to wireless module 504. Wireless module 504 uses, for example, Bluetooth® technology to send the operation information from antenna 505 as a carrier wave signal having a specified frequency. Thus, operation signal data from operation section 302, the X-axis, Y-axis and Z-axis direction acceleration data from acceleration sensor 507, and the processing result data from imaging information calculation section 505 are transmitted from controller 107. Game console 100 receives the carrier wave signal and demodulates or decodes the carrier wave signal to obtain the operation information (e.g., the operation signal data, the X-axis, Y-axis and Z-axis direction acceleration data, and the processing result data). Based on this received data and the application currently being executed, CPU 204 of game console 100 performs application processing. If communication section 506 is structured using Bluetooth® technology, controller 107 can also receive data wirelessly transmitted thereto from devices including game console 100.

Figure 6A:
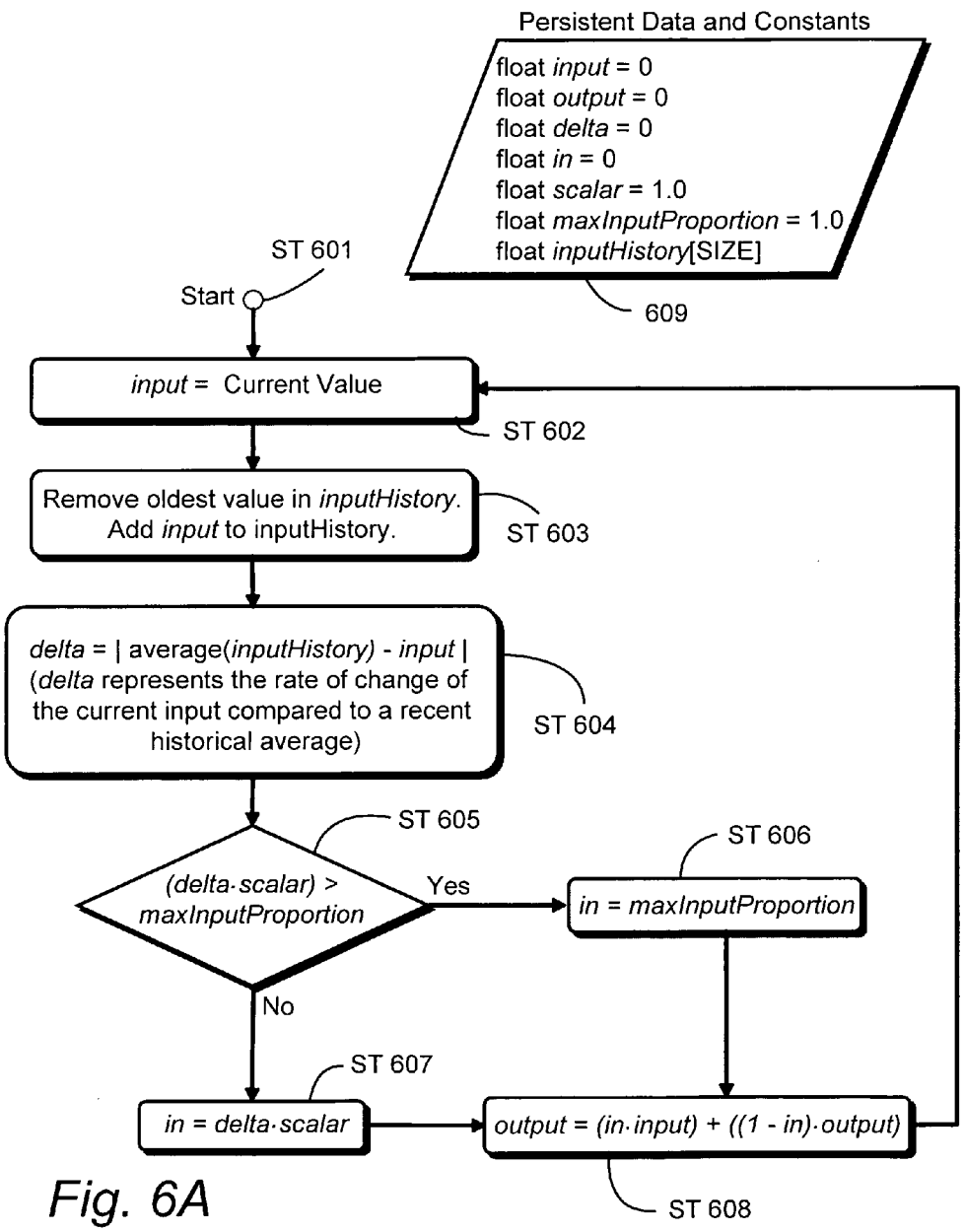
FIG. 6A is flow chart showing an example adaptive filter operation.
Figure 6B:
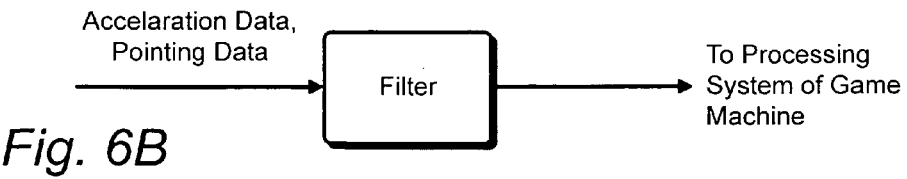
FIG. 6B is a schematic representation of the input to and output from an example adaptive filter.

FIG. 6A shows an example adaptive filtering algorithm. As shown schematically in FIG. 6B, the example algorithm is supplied, for example, acceleration date from acceleration sensor 507 or pointing data corresponding to a pointing direction detected using the optical pointing arrangement described above. The algorithm produces a filtered output signal that is supplied to the processing system of the game machine (e.g., to move a displayed game object). The example FIG. 6A algorithm filters the inputs thereto so that at some times the filtering provides an output that is equal to (or substantially equal to) a prior output of the algorithm. In this case, the filter can be viewed as providing a stable (or substantially stable) output that is unresponsive to (or substantially unresponsive to) changes in the input. At other times, the filtering provides an output that is equal to (or substantially equal to) the signal supplied as an input thereto. In this case, the filter can be viewed as providing an output that is responsive to (or substantially responsive to) changes in the input. At still other times, the filtering provides an output in between the stable (unresponsive) output and the responsive output. A linear interpolation can be used in order to smoothly transition from the stable output to the responsive output. Of course, a non-linear interpolation can be provided if desired for a particular implementation.

The example FIG. 6A algorithm uses a ring buffer to maintain a history of signal values input thereto. The stability/responsiveness of the algorithm output with respect to changes in the input is based on comparisons between a current signal value and an average (or some other mathematical combination) of the signal values in the history. When a new signal value is added to the ring buffer, the oldest signal value is removed. The example FIG. 6A algorithm is not limited to any particular size for the ring buffer. Generally, for reducing jitter as described herein, a ring buffer for acceleration data and pointing data the ring buffer should contain about one (1) second worth of data (60 samples at 60 fps). This amount can be tuned to particular applications and could vary by way of example without limitation from 0.1 seconds to 3.0 seconds worth of data. The number of samples in the ring buffer is not critical; rather the time period relative to how humans move is preferably taken into account.

The size of the ring buffer could be dynamically changed to simulate how calm or jumpy the in-game player is, based on mood, sleep, or other simulated physical or psychological factors. For example, in a war simulation game, the player's aim for their rifle might be very steady if the in-game player is well rested and calm. However, if the environmental chaos increases or the in-game player is tired, nervous, or shell-shocked, the player's aim might be purposely jumpy. The size of the ring buffer is one control to simulate such an effect.

Text box 609 in FIG. 6A shows various data and constants used by the example algorithm. input, output, delta, and in are floating point variables each initially set to 0. Of course, the variables that are initialized to zero do not actually need to be set because they will be overwritten during the course of the algorithm. scalar and maxInputProportion are floating point variables each initially set to 1.0. Of course, the values of these parameters are provided by way of example without limitation and other values can be used as explained below. inputHistory is a one-dimensional matrix with a number of entries fixed by the value of SIZE. In the example algorithm, input corresponds to the acceleration or pointing data provided to the input side of the filter shown in FIG. 6B and output corresponds to the output on the output side of the filter shown in FIG. 6B. This output may be supplied to the game processing system to, for example, move a game object.

The process starts at ST 601 and, at ST 602, the variable input is set to the current acclerometer sensor signal value (e.g., a y-axis accelerometer signal value). At ST 603, the oldest value in the inputHistory ring buffer is removed and input is added to inputHistory. At ST 604, delta is calculated as the absolute value of the difference between the average of the values in inputHistory and input. A weighted average could be used to emphasize particular samples. This would help tune the feel of the filter to either be more or less stable. Delta corresponds to a difference between the current input and a recent historical average.

At ST 605, a determination is made as to whether the value of delta multiplied by a scalar value (which, in this example algorithm, is 1.0) is greater than maxInputProportion. If so, in is set to maxInputProportion at ST 606 and the algorithm proceeds to ST 608. If not, in is set to the result of delta multiplied by the scalar value at ST 607 and the algorithm proceeds to ST 608.

At ST 608, output is calculated in accordance with the formula:

$$output=(in \cdot input)+((1-in) \cdot output)$$

output is the filtered acceleration or pointing data that is then used as an input to the game processing system for, for example, positioning a steering wheel in a driving game or moving an object on the screen or moving a screen cursor (like an aiming reticle for a rifle).

The variable scalar is preferably set to a value relative to the possible range that delta could be. The variable scalar is multiplied by delta and the result must be generally less than or equal to maxInputProportion. So if delta ranges from 0.0 to 0.5 and maxInputProportion is equal to 1.0, then scalar should be 2.0. If delta ranges from 0.0 to 2.0, then scalar should be 0.5. However, there is some leeway, since the main test (ST 605) uses maxInputProportion as an upper bound. Consequently, if scalar*delta is generally less than maxInputProportion, this is acceptable.

The variable maxInputProportion is an upper bound to define in the most responsive case how much to mix the current input with the last output. If maxInputProportion is 1.0, then the algorithm results in 100% of the current input in the most responsive case. If maxInputProportion is 0.8, then the algorithm results in 80% of the current input (and 20% of the last output) in the most responsive case.

Thus, the values of scalar and maxInputProportion generally depend on how responsive the most responsive case should be. Therefore, maxInputProportion should be 1.0 to get the most responsive effect when the input is changed quickly. However, physical systems like a steering wheel cannot move instantaneously, so it can be advantageous to have maxInputProportion be equal to 0.7 or 0.8 to simulate non-instantaneous movement by not being so extremely responsive. Values like 0.7 or 0.8 cause the output to look "rounder" and more smooth since averaging is occurring.

The example FIG. 6A algorithm can be viewed as an adaptive filter with a sliding control. With the control set at 0.0, the output is equal to the previous output (completely stable). With the control set at 1.0, the output is equal to the raw input (completely responsive). When the slider is between 0.0 and 1.0, the output is a linear combination of the raw input and the previous output. The slider is controlled by the delta between the current input and a moving historical average of previous inputs.

In practice, when a person holds the controller steady, the acceleration and/or pointing data bounce around an average. The delta in this case is very small, so the example FIG. 6A algorithm results in very stable output. When a person moves the controller suddenly, the delta between the most recent input and the historical moving average is quite large, which results in completely responsive output (by using 100% of the most recent input). When the controller changes from being steady to being moved vigorously, the filter weights are ramped (linear interpolation) accordingly in order to smoothly transition from steady output to responsive output. The result is that the output signal supplied to game processing system is always substantially smooth without any noticeable jarring transitions when the filter adapts to the current controller movement.

Hysteresis can be added to eliminate minor variations due to handshaking (appropriately sized steps between hysteresis center points can provide requisite fine degree of control). The hysteresis can be applied for some purposes (e.g., vehicle control) but not for other purposes (e.g., simultaneous steering wheel appearance) if desired. These techniques are particular advantageous for driving game steering wheel simulation.

More specifically, in certain applications, like high-speed steering, the filtered input should preferably not waver back and forth, since this could cause swerving. To deal with this case, hysteresis can be added to the filter as a final step to avoid wavering at the expense of discretizing the continuous input into buckets of a specified size (such as 0.5 or 1.0 rotational degrees). Hysteresis is preferred to simple discretization (via reducing resolution), since hysteresis can eliminate jumping back and forth between two discrete values. While hysteresis is described as being part of the filter, it will be readily recognized and appreciated that hysteresis can also be viewed as being applied to the output of the filter.

Figure 8:
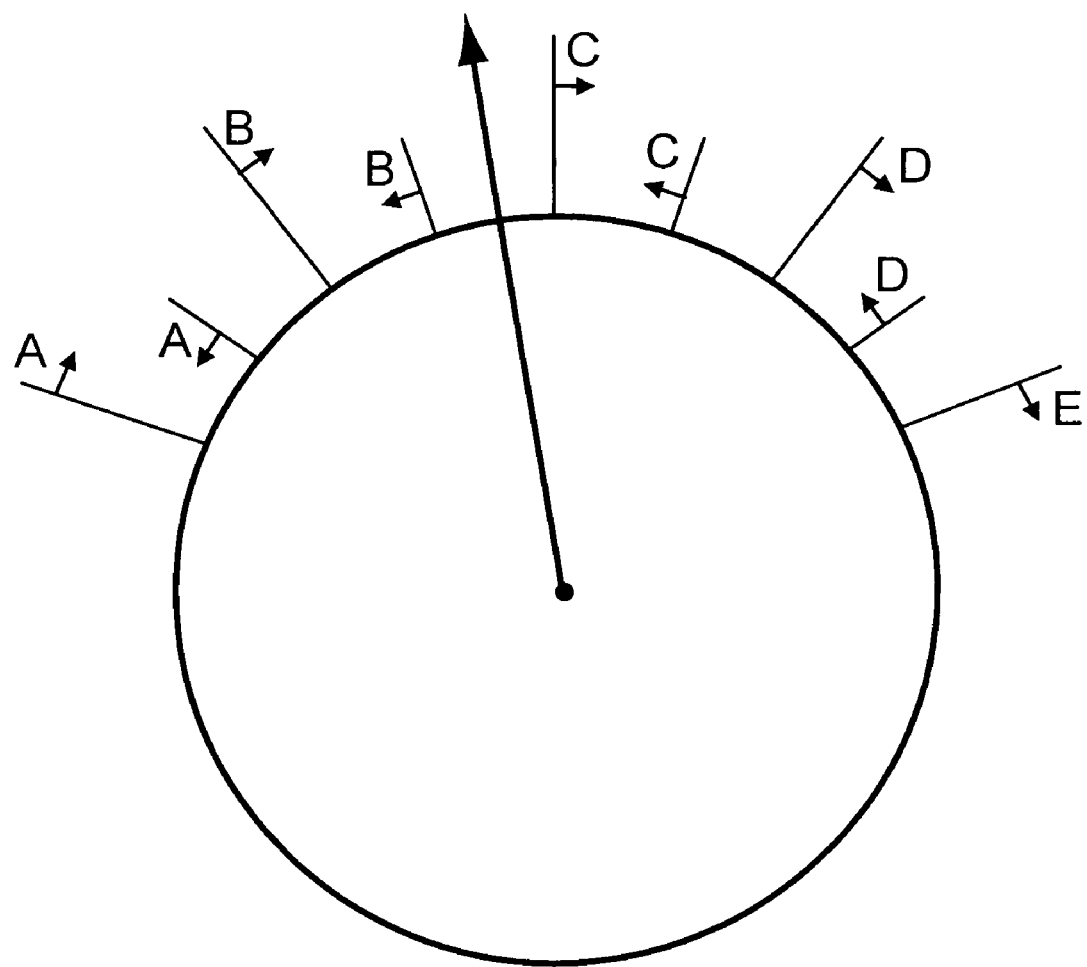

Hysteresis for a rotational input variable is shown in FIG. 8. In FIG. 8, the input is discretized into regions A, B, C, etc. (which could represent degrees or other units of measurement). As the input crosses a boundary (in the direction of the arrow on the boundary), it adopts the marked region for that boundary. For example, if the input has been discretized to be in the A region and increases to pass the boundary with an increasing (rightward) arrow marked "B", then it takes on the "B" value of that boundary region. If the input begins to decrease and passes a boundary with a decreasing (leftward) arrow marked "A", then it takes on the "A" value of that boundary region. Note that the current region is determined by a history of events and that it is not possible to determine the current region by looking at a static time slice. The current region must be remembered as a state variable and can change based on what boundaries it passes. Through this method, hysteresis minimizes or prevents jumping back and forth between two discrete regions.

Depending on the application, the example FIG. 6A algorithm may, for example, be separately executed for each axis of the accelerometer sensor (i.e., x-axis, y-axis, and z-axis) or the algorithm may be applied to a resultant input derived from some combination of two or more axes of the accelerometer sensor. There may be games or applications that concurrently use acceleration data and pointing data. In this case, the example FIG. 6A algorithm (with or without hysteresis) may be separately executed for the acceleration data and the pointing data.

The example FIG. 6A algorithm may be implemented by program instructions, data structures, program modules and/or other data encoded onto a computer-readable medium such as an magnetic, semiconductor, optical, magneto-optical, ferroelectric or other type of memory. These program instructions, data structures, program modules and/or other data may also be provided as a data signal modulated onto a carrier wave.

The example FIG. 6A algorithm (and any hysteresis) may be executed by processing circuitry in controller 107 (e.g., micro-computer 502), processing circuitry in game machine 100 (e.g., CPU 204), or partly by processing circuitry in controller 107 and partly by processing circuitry in game machine 100.

FIGS. 7A-7D are used to explain how the example FIG. 6A algorithm may be applied to steering a racing car in a racing car video game.

Figure 7A:
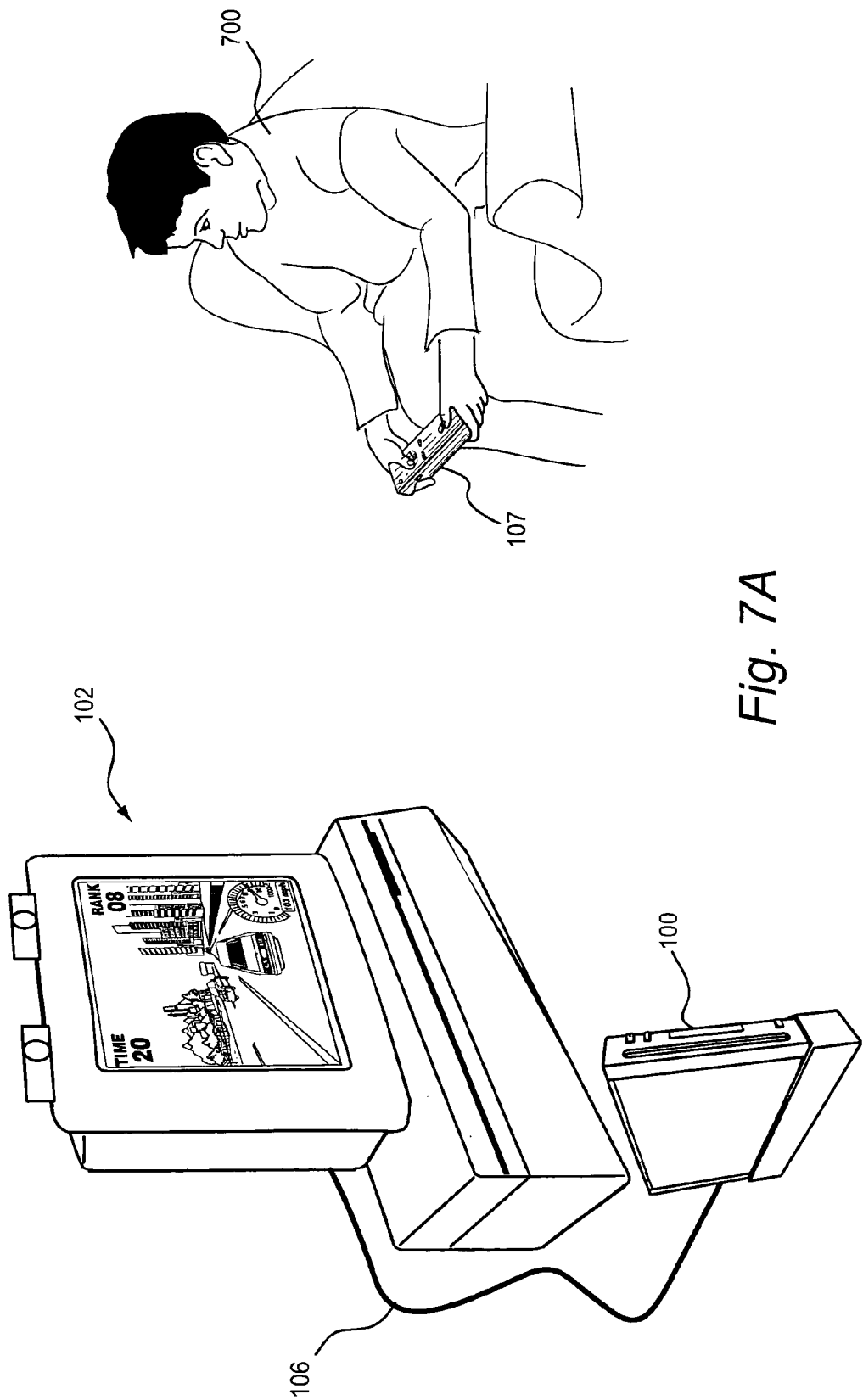
FIGS. 7A-7D are used to explain how the example FIG. 6 algorithm may be applied to steering a racing car in a racing car video game.
Figure 7B:
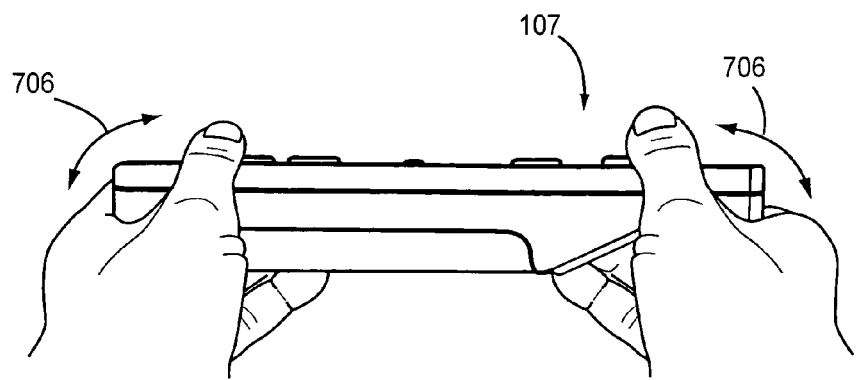
Figure 7C:
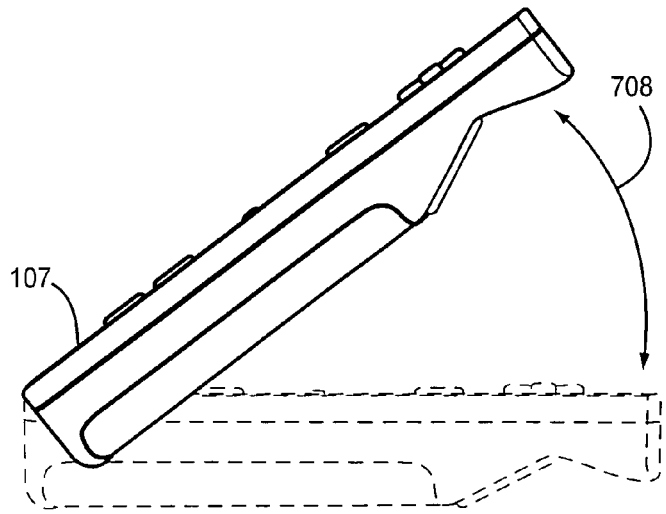
Figure 7D:
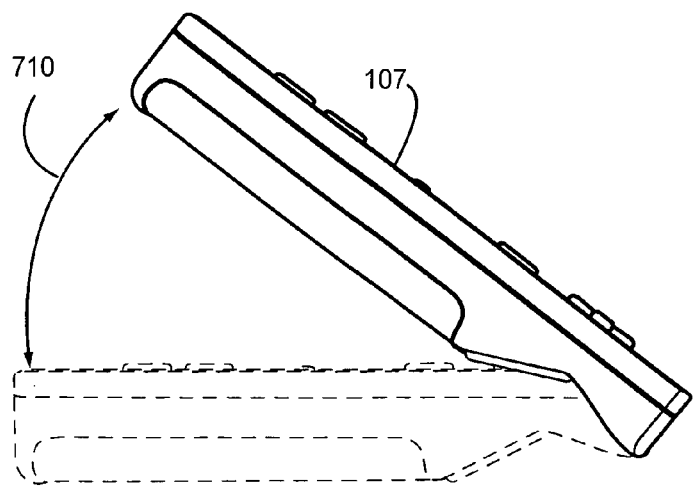

With reference to FIG. 7A, a player 700 is playing a racing car video game using the game system shown in FIG. 1. The steering of the racing car is controllable by tilting controller 107 as shown in FIGS. 7B-7D. To drive straight, player 700 would hold controller 107 as shown in FIG. 7B. To turn to the left, player 700 would move controller 107 to the position shown in FIG. 7C. To turn right, player 700 would move controller 107 to the position shown in FIG. 7D. The various positions of controller 107 in FIGS. 7B-7D may be determined using, for example, the y-axis and z-axis accelerometer sensor outputs. The example FIG. 6A algorithm may be applied to the individual accelerometer sensor outputs (or to some combination thereof) to reduce jitter associated with, for example, slight movements of a player's hands when holding controller 107 as shown in FIG. 7B.

More specifically, when the car is driven straight, the user generally holds controller 107 steady in the position shown in FIG. 7B, but there may be slight bounces 706 around this "drive straight" position. Relatively small changes in accelerometer sensor outputs are generated by such slight bounces. In accordance with the example FIG. 6A algorithm, the algorithm delta is very small in this case and therefore the algorithm output corresponding to each of the y-axis and z-axis accelerometer sensors will be equal to or substantially equal to the prior algorithm output for these sensors. Consequently, the algorithm output for each of the y-axis and z-axis accelerometer sensors is stable (e.g., not responsive to the slight bounces).

In order to make a sharp right or left turn, the player makes a sudden movement 708 or 710 of the controller as shown in FIGS. 7C and 7D, respectively. Relatively large changes in accelerometer sensor outputs are generated by such sudden movements. In accordance with the example FIG. 6A algorithm, the algorithm delta is large in this case and therefore algorithm output corresponding to each of the y-axis and z-axis accelerometer outputs will be equal to or substantially equal to algorithm input for each of the y-axis and z-axis accelerometer sensors. Consequently, the algorithm output for each of the y-axis and z-axis accelerometer sensors is responsive to the sudden movement.

While the systems and methods have been described in connection with that is presently considered to practical and preferred embodiments, it is to be understood that these systems and methods are not limited to the disclosed embodiments, but on the contrary, is intended to cover various modifications and equivalent arrangements included within the spirit and scope of the appended claims.

We claim:

1. A method for filtering outputs of a sensor of a handheld video game controller, the method comprising:
    comparing, using a processing system, a current sensor output value with an average of multiple prior sensor output values; and
    based on the comparing, generating, using the processing system, a filtered sensor value used as a video game input and which is in a range determined by the current sensor output value and a prior sensor output value.

2. The method according to claim 1, wherein the filtered sensor value is generated based on whether a scaled difference between the current sensor output value and the average sensor output value exceeds a specified value.

3. The method according to claim 1, further comprising determining the average sensor output value by averaging sensor output values stored in a ring buffer.

4. The method according to claim 3, wherein the averaging comprises a weighted averaging.

5. The method according to claim 1, wherein the sensor output comprises an accelerometer output indicative of movement or orientation of the video game controller.

6. The method according to claim 1, wherein the sensor output is indicative of a direction in which the video game controller is pointing.

7. The method according to claim 1, further comprising: applying hysteresis to the filtered sensor value.

8. The method according to claim 1, further comprising determining the average sensor output value by averaging a dynamically varying number of sensor output values.

9. A computer-readable medium having computer program code embodied thereon which, when executed, causes a processor to perform a method of filtering outputs of a sensor of a hand-held video game controller, the method comprising:
    comparing a current sensor output value with an average of multiple prior sensor output values; and
    based on the comparing, generating a filtered sensor value used as a video game input and which is in a range determined by the current sensor output value and a prior sensor output value.

10. The computer-readable medium according to claim 9, wherein the sensor output comprises an accelerometer output indicative of movement or orientation of the handheld video game controller.

11. The computer-readable medium according to claim 9, wherein the sensor output is indicative of a direction in which the video game controller is pointing.

12. The computer-readable medium according to claim 9, wherein hysteresis is applied to the filtered sensor value.

13. The computer-readable medium according to claim 9, wherein the average sensor output value is determined by a weighted averaging.

14. The computer-readable medium according to claim 9, wherein the average sensor output value is determined by averaging a dynamically varying number of input values.

15. A system for filtering output values of a sensor for a controller for a video game system, the system comprising:
    a ring buffer for storing a plurality of prior sensor output values; and
    a processing system for determining an average of the sensor output values in the ring buffer, comparing a current sensor output value with the average sensor output value, generating, based on the comparing, a filtered sensor value which is in a range determined by the current sensor output value and a prior sensor output value and using the filtered sensor value as an input to a video game program executed by the processing system.

16. The system according to claim 15, wherein the filtered sensor value is generated based on whether a scaled difference between the current sensor output value and the average sensor output value exceeds a specified value.

17. The system according to claim 15, wherein the average is determined as a weighted average.

18. The system according to claim 15, wherein the sensor output comprises an accelerometer output indicative of movement or orientation of the controller.

19. The system according to claim 15, wherein the sensor output is indicative of a direction in which the controller is pointing.

20. The system according to claim 15, wherein the processing system applies hysteresis to the filtered sensor value.

21. The system according to claim 15, wherein the average sensor output value is determined by averaging a dynamically varying number of sensor output values in the ring buffer.

22. The system according to claim 15, wherein the processing circuitry is part of the controller.

23. The system according to claim 15, wherein the processing circuitry is part of a console of the video game system.

* * * * *